United States Patent [19]

Saotome et al.

[11] Patent Number: 4,664,408
[45] Date of Patent: May 12, 1987

[54] STABILIZER FOR MOTOR ROAD VEHICLES

[75] Inventors: Masaru Saotome, Isehara; Fumitaka Saigo; Hitoshi Kokubun, both of Zama, all of Japan

[73] Assignee: Nissan Motor Co., Ltd., Japan

[21] Appl. No.: 781,684

[22] Filed: Sep. 30, 1985

[30] Foreign Application Priority Data

Nov. 9, 1984 [JP] Japan .................. 59-169864[U]

[51] Int. Cl.⁴ ............................................. B60G 21/00
[52] U.S. Cl. ..................................... 280/689; 280/721
[58] Field of Search ............... 280/689, 697, 721, 695, 280/149, 700, 717, 725

[56] References Cited

U.S. PATENT DOCUMENTS 4,429,900 2/1984 Feber ................................... 280/689
4,469,349 9/1984 Tomita ................................ 280/689

FOREIGN PATENT DOCUMENTS 2053649 5/1972 Fed. Rep. of Germany.
2844028 4/1980 Fed. Rep. of Germany.
57-66009 4/1982 Japan.
59-34910 2/1984 Japan.
59-129613 8/1984 Japan.
2006131A 5/1979 United Kingdom.

Primary Examiner—Richard A. Bertsch
Attorney, Agent, or Firm—Leydig, Voit & Mayer

[57] ABSTRACT

A pair of upstanding connecting rods connected to the free ends of a U-shaped stabilizer bar are axially movably supported on respective vehicle body brackets or suspension members. A locking mechanism is provided to prevent axial movement of the connecting rods relative to the vehicle body brackets or suspension members when to make the stabilizer bar effective. A selection mechanism is mechanically connected to the locking mechanism to actuate the same to selectively prevent and allow the above mentioned axial movement of the connecting rods.

9 Claims, 4 Drawing Figures

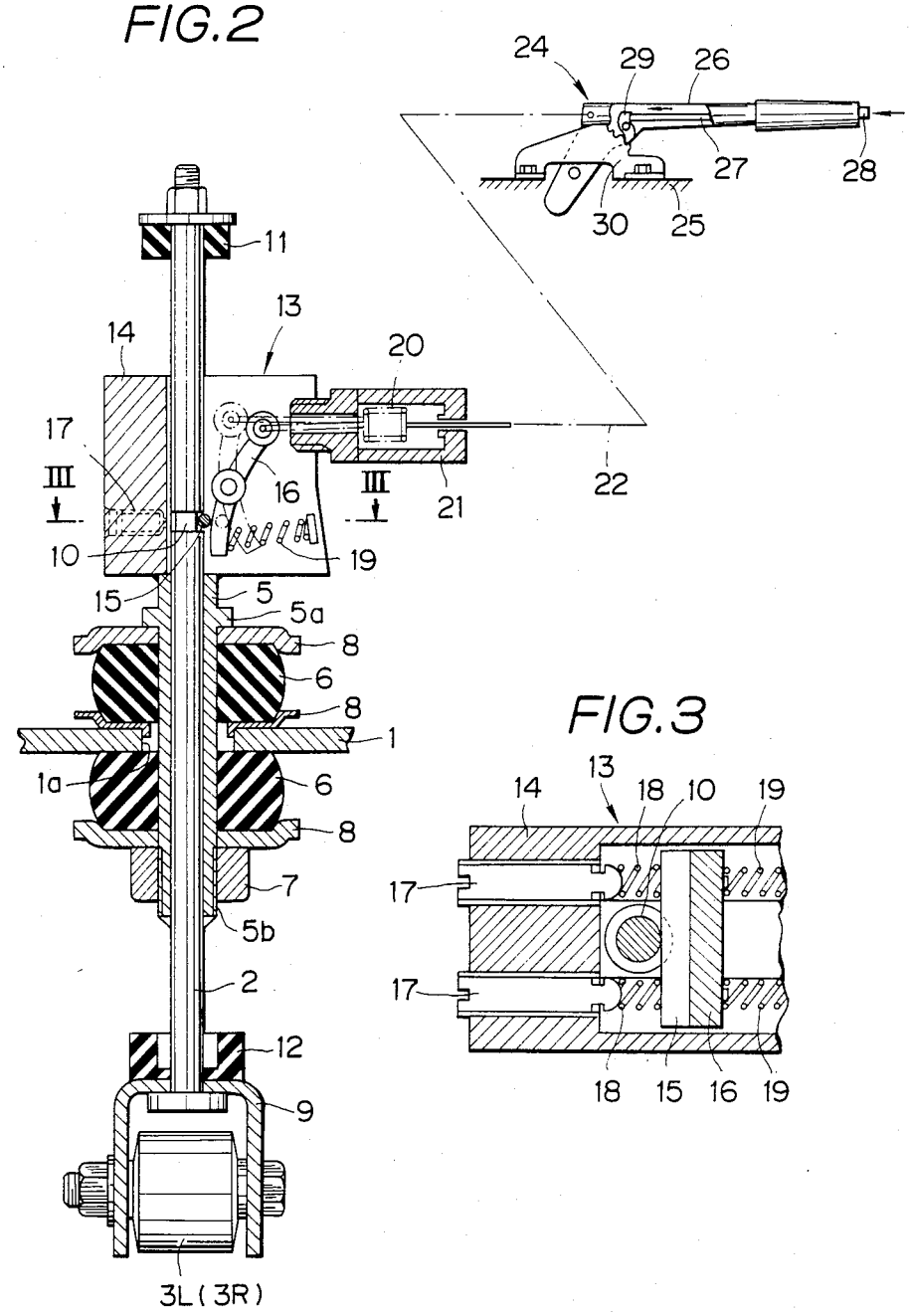

STABILIZER FOR MOTOR ROAD VEHICLES

BACKGROUND OF THE INVENTION

1. Field of the Invention

The present invention relates to a stabilizer for motor road vehicles, particularly of the type capable of changing the roll rigidity of the associated vehicle depending upon variations of running condition.

2. Description of the Prior Art

A motor vehicle stabilizer of the above mentioned type is well known in the art as is, for example, disclosed in the Japanese Provisional Patent Publication No. 57-66009 and the Japanese Utility Model Publication No. 59-129613.

In this type of stabilizer, a channel-shaped stabilizer bar, which has a pair of arm portions connected to suspension arms carrying left and right vehicle wheels, is divided into two parts, a left-hand part and right-hand part. One of the parts is connected with a piston and the other with a cylinder. The piston is movable in the cylinder and defines a pair of hydraulic chambers at the opposite ends thereof. The hydraulic chambers are communicated with each other through a conduit in which a control valve is disposed to establish or obstruct communication between the hydraulic chambers in such a manner that a softer ride is obtained upon high-speed straight-ahead running and an increased roll rigidity upon turning.

A disadvantage of the above mentioned stabilizer is that it is complicated in structure, particularly when used in a four-wheel-drive vehicle, and it is not highly reliable in operation since the sealing members utilized in the hydraulic cylinder are likely to be deteriorated to prevent the stabilizer from effecting a desired stabilizing action. Furthermore, the above mentioned stabilizer tends to increase the unsprung weight of the vehicle.

Another stabilizer of the above mentioned kind is disclosed in the Japanese Provisional Patent Publication No. 59-34910.

In this stabilizer, the free ends of the stabilizer bar are connected through coil springs to suspension arms. The compressed state of the coil springs is manually controllable to change the effectiveness of the stabilizer.

A disadvantage of this latter stabilizer is that the effectiveness of the stabilizer cannot be changed so largely and it cannot provide a highly reliable operation due to its cam structure.

SUMMARY OF THE INVENTION

In accordance with the present invention, there is provided a novel and improved stabilizer for a motor vehicle having a body and a pair of laterally opposed road wheels independently suspended on the vehicle body.

The stabilizer comprises a stabilizer bar extending tranversely of the vehicle body between the road wheels and a pair of connecting rods interconnecting, together with the stabilizer bar, the vehicle body and the road wheels.

The stabilizer further comprises support means for permitting axial movement of the connecting rods to make the stabilizer bar ineffective, locking means for preventing axial movement of the connecting rods relative to the support means to make the stabilizer bar effective. The locking means includes a mechanical linkage movable between a first position wherein the linkage engages the connecting rods to prevent axial movement and a second position wherein the linkage is disengaged from the connecting rods to permit the axial movement. The stabilizer further comprises selection means mechanically connected to the locking means for actuating the mechanical linkage to selectively prevent and allow the above mentioned axial movement of the connecting rods.

This structure is quite effective for overcoming the above noted disadvantages inherent in the prior art devices.

It is accordingly an object of the present invention to provide a novel and improved stabilizer of the above mentioned kind which is simple in structure and reliable in operation.

It is a further object of the present invention to provide a novel and improved stabilizer of the above mentioned character which is particularly suited for use in four-wheel-drive vehicles.

BRIEF DESCRIPTION OF THE DRAWINGS

The features and advantages of the stabilizer according to the present invention will become more clearly appreciated from the following description taken in conjunction with the accompanying drawings, in which like reference characters designate like or corresponding parts throughout the several views thereof and wherein:

FIG. 2 is a sectional view of a novel important portion of the stabilizer of FIG. 1;

FIG. 3 is a sectional, partly cut-away, view taken along the line III—III of FIG. 2.

DETAILED DESCRIPTION OF THE PREFERRED EMBODIMENTS

Figure 1:
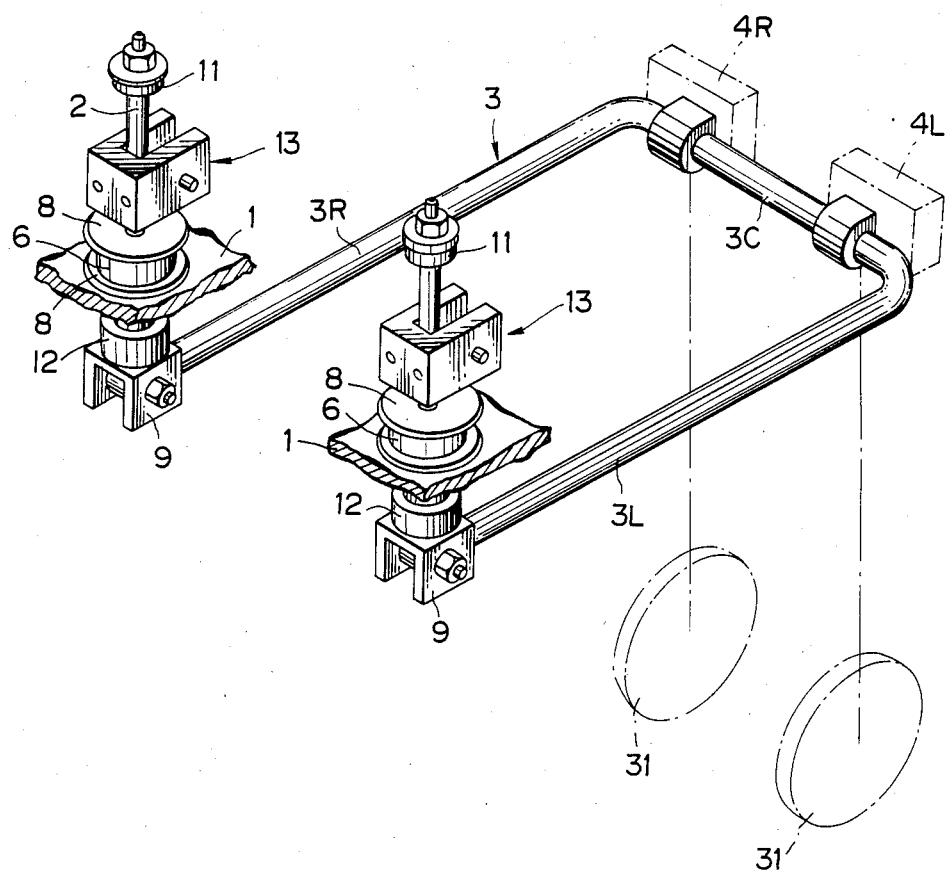
FIG. 1 is a perspective view of a stabilizer according to an embodiment of the present invention.

Referring first to FIGS. 1 through 3, the reference numeral 1 designates a pair of brackets or support members constituting part of a vehicle body. The vehicle body brackets 1 are arranged with a predetermined space in the lateral direction of the vehicle body. A pair of upstanding connecting rods 2 are axially movably mounted on the vehicle body brackets 1. A stabilizer bar 3 is U-shaped to have a central portion 3C extending transversely of the vehicle body and a pair of arm portions 3L, 3R at the opposite ends of the central portion 3C and extending longitudinally of the vehicle body. The stabilizer bar 3 is swingably connected at the free ends of the arm portions 3L, 3R to the lower ends of the connecting rods 2 and at the places adjacent the opposite ends of the central portion 3C to a pair of suspension members 4L, 4R such as transverse links, axles or the like.

The connection between the vehicle body brackets 1 and the connecting rods 2 are shown in detail in FIG. 2. As illustrated, the vehicle body bracket 1 has a horizontal plate section formed with an opening 1a through which an upstanding tubular guide member 5 passes to project upwardly and downwardly. The guide member 5 has an annular outward flange 5a adjacent the upper end thereof and a threaded lower end portion 5b. A pair of tubular rubber bushings 6 are mounted on the guide member 5 in such a manner as to interpose therebetween the vehicle body bracket 1 or in such a manner as to be respectively located on the opposite sides of the vehicle body bracket 1. A pair of washers 8 are provided one of which is placed between the annular flange 5a and the upper rubber bushing 6 and the other is placed on the lower end of the lower rubber bushing 6. A nut 7 is screwed onto the threaded lower end portion 5b of the guide member 5 and cooperates with the flange 5a to clamp therebetween the vehicle body bracket 1 together with the rubber bushings 6 and thereby resiliently fasten the guide member 5 to the vehicle body bracket 1.

The connecting rod 2 is slidably mounted in the guide member 5 and projects upwardly and downwardly therefrom. To the lower end of the connecting rod 2 there is fixedly attached a U-shaped bracket 9 to which the free end of the left and right stabilizer bar arm portions 3L, 3R are pivotally connected. The connecting rod 2 has in the outer circumferential periphery thereof an annular groove 10 which is located a little higher than the midpoint thereof. A pair of rubber stoppers 11, 12 are respectively mounted on the upper and lower ends of the connecting rod 2 to limit axial movement of same while absorbing a shock.

On the upper end of the guide member 5 there is mounted a locking mechanism 13 including a channel-shaped casing 14 partly surrounding the connecting rod 2 and having a pair of parallel side walls 14a, to which casing 14 of the guide member 5 is fixedly attached at the upper end thereof, a locking pin 15 disposed between the side walls 14a and movable toward and away from the connecting rod 2 to be engaged with and disengaged from the annular groove 10, a control lever 16 swingably mounted at a portion intermediate between the opposite ends thereof and engageable at an end with the locking pin 15, a pair of springs 18 mounted in the casing 14 for urging the locking pin 15 in the direction moving away from the annular groove 10, a pair of adjusting screws 17 screwed into the casing 14 for adjusting the biasing force applied from the springs 18 to the locking pin 15 and a pair of springs 19 mounted in the casing 14 for urging the control lever 16 in the clockwise direction in the drawing to apply to the locking pin 15 such a biasing force that is smaller than the biasing force applied thereto from the springs 18.

The other end of the control lever 16 of the locking mechanism 13 is connected through a cable 22 equipped with an extensible and contractible coupling 21 including a spring 20, to a manually operated selection mechanism 24 disposed adjacent a driver's seat (not shown) of the vehicle.

The manually operated selection mechanism 24 includes a selection lever 26 pivotally mounted on a vehicle body member 25 and a release rod 27 axially movably mounted in the selection lever 26. To an end of the release rod 27 there is mounted a release button 28 projecting outwardly from an end of the selection lever 26. The other end of the release rod 27 is connected to an end of a pawl 29. The pawl 29 is pivotally mounted at a portion intermediate between the opposite ends thereof and has at the other end a finger engageable with teeth of a stationary ratchet member 30. The other end of the selection lever 26 is connected to the cable 22.

The stabilizer thus far described according to an embodiment of the present invention operates as follows.

When the selection lever 26 of the manually operated selection mechanism 24 is turned downward to assume a position shown in FIG. 2, the control lever 16 is pulled by the cable 22 and the spring 20 of the extensible and contractible coupling 21 to turn clockwise to assume a position shown by the solid lines in FIG. 2, causing the locking pin 15 to bodily move leftward in the drawing against the bias of the springs 18 and engage the groove 10. By this, the connecting rod 2 is joined together with the casing 14 and therefore the vehicle body bracket 1, holding the free ends of the stabilizer bar arm portions 3L, 3R stationary relative to the vehicle body. When this is the case, since the stabilizer bar 3 is connected at the central portion 3C to the suspension members 4L, 4R on which a pair of vehicle wheels 31 are independently suspended, the central portion 3C of the stabilizer bar 3 is subjected to torsion when there is a difference in upward and downward movement between the vehicle wheels 31, whereby to resist relative movement of the vehicle wheels and attain a good drivability and running stability of the vehicle upon running on a smooth surface road.

When the selection lever 26 is turned counterclockwise from the position illustrated in the drawing with the release button 28 being pressed to release the pawl 29 from engagement with the teeth of the ratchet member 30, the cable 22 is moved leftward to release the locking pin 15 from being pushed by the control lever 16. The locking pin 15 is thus caused by the springs 18 to move rightward in the drawing with the control lever 16 being turned counterclockwise against the bias of the springs 19. The locking pin 15 is therefore removed or disengaged from the groove 10, allowing the connecting rod 2 to move freely relative to the vehicle body bracket 1. As a result, when the vehicle wheels move upwardly and downwardly in such a manner that a difference in vertical position therebetween increases, such relative movement of the vehicle wheels is absorbed by upward and downward movement of the connecting rods 2, whereby to reduce the effectiveness of the stabilizer bar 3 to attain a softer ride and a good tire-to-road contact and therefore a good running stability upon running on a rough surface road. In this instance, while the vehicle wheels 32 bound and rebound allowing the connecting rods 2 to move relative to the vehicle body bracket 1 to strike the nut 7 and the casing 14, shocks and striking sounds are not caused since absorbed by the rubber stoppers 11, 12 at the opposite ends of the connecting rod 2. The rubber stoppers 11, 12 also prevent the connecting rod 2 from being slipped off from the guide member 5.

When the selection lever 26 of the selection mechanism 24 is turned again clockwise from the position reducing the effectiveness of the stabilizer bar 3, the cable 22 is pulled rightwardly in the drawing, causing the control lever 16 to turn clockwise and thereby urging the locking pin 15 toward the position where it is engaged in the groove 10. In this instance, when the connecting rod 2 is located at such a position where the groove 10 assumes the same vertical position as the locking pin 15, the locking pin 15 is immediately inserted into the groove 10 to allow the stabilizer bar 3 to effect a stabilizing action. On the other hand, when the connecting rod 2 is located at such a position where the groove 10 assumes a vertical position different from that of the locking pin 15, the locking pin 15 is pushed against the periphery of the connecting rod 2. The control lever 16 is thus prevented from turning further and held at a halway position. However, even when the control lever 16 is under such a condition as above, the selection lever 16 can be turned into the predetermined position shown in the drawing since the spring 20 of the extensible and contractible coupling 21 extends to allow such turning of the selection lever 16.

From this time onward, when upward and downward movement of the vehicle wheels causes the connecting rod 2 to move into such a position where the groove 10 assumes the same vertical position as the locking pin 15, the control lever 16 is turned clockwise by the force of the spring 20 of the extensible and contractible coupling 21, causing the locking pin 15 to move leftward against the bias of the springs 18 and engage the groove 10 and thereby enabling the stabilizer bar 3 to effect a stabilizing action.

Figure 4:
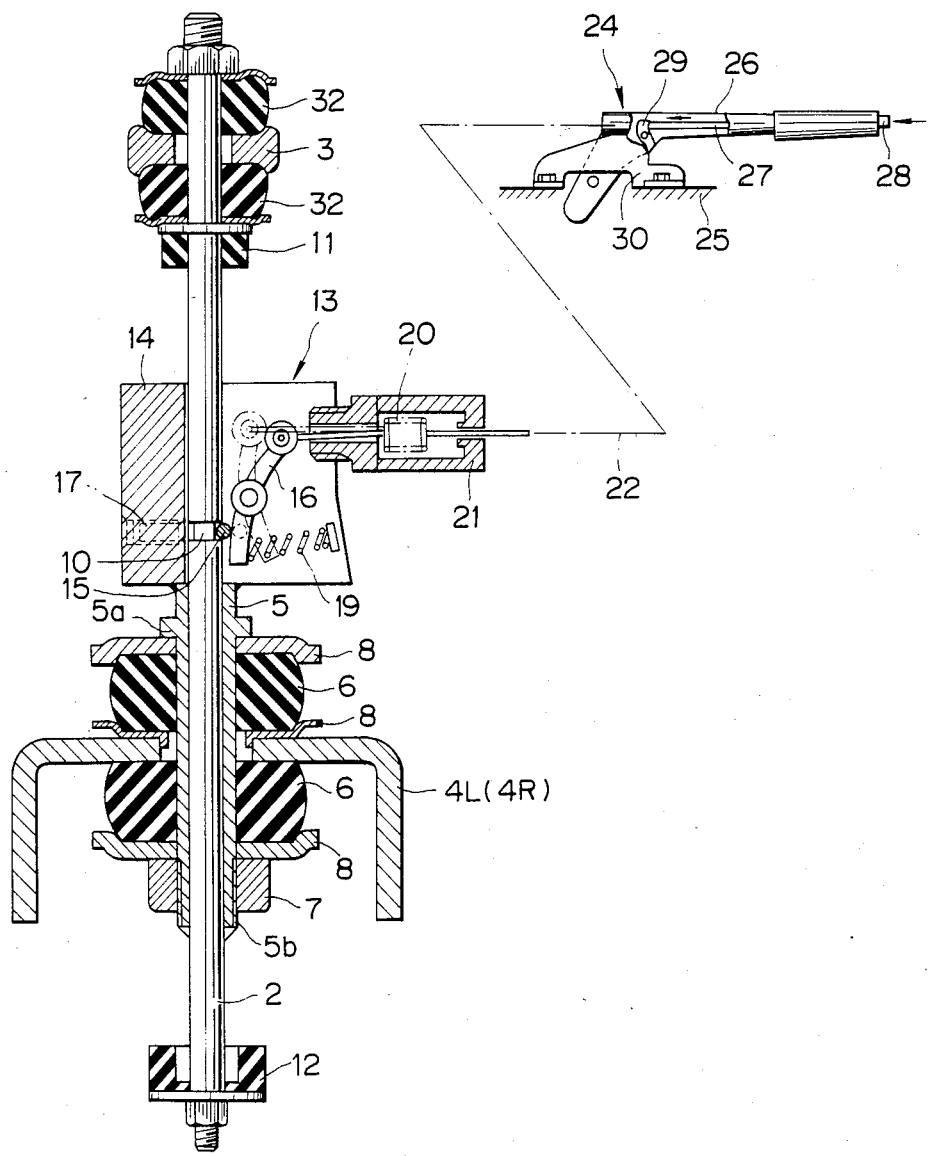
FIG. 4 is a view similar to FIG. 2 but showing another embodiment of the present invention.

While the stabilizer bar 3 has been described and shown as being connected at the free ends thereof to the vehicle body bracket 1 through the connecting rods 2, this is not limitative and it may otherwise be attached to the vehicle body and the suspension members 4L, 4R. For example, as shown in FIG. 4, the connecting rods 2 may be slidably mounted on the suspension members 4L, 4R in place of being mounted on the vehicle body bracket as in the previous embodiment, and the free ends of the stabilizer bar arm portions 3L, 3R are secured to the upper ends of the connecting rods 2 by way of respective pairs of rubber bushings 32. The stabilizer bar 3 is also pivotally mounted at the central portion 3C on the vehicle body. The remaining structure is substantially similar to the previous embodiment. With this modification of FIG. 4, substantially the same effects as the previous embodiment can be obtained.

Further, while in the previous embodiments the cable 22 is used for interconnecting the locking mechanism 13 and the selection mechanism 24, this is not limitative and it may be replaced by another mechanical connecting means such as for example links.

What is claimed is:

1. A stabilizer for a motor vehicle, said vehicle having a body and a pair of laterally opposed road wheels suspended on the vehicle body, comprising:
   a stabilizer bar extending transversely of the vehicle body between the road wheels;
   a pair of connecting rods interconnecting the vehicle body and the road wheels together with said stabilizer bar;
   support means for permitting axial movement of said connecting rods to make said stabilizer bar ineffective;
   locking means for preventing axial movement of said connecting rods relative to said support means to make said stabilizer bar effective, and locking means including a mechanical linkage movable between a first position wherein the linkage engages the connecting rods to prevent said axial movement and a second position wherein the linkage is disengaged from the connecting rods to permit said axial movement, and
   selection means mechanically connected to said locking means for actuating the mechanical linkage to selectively prevent and permit said axial movement.

2. A stabilizer as set forth in claim 1 wherein said interconnecting support means comprises a pair of vehicle body brackets constituting part of the vehicle body, wherein said stabilizer bar is U-shaped and has a central portion carrying thereat the road wheels and a pair of arm portions at the opposite ends of said central portion, and wherein said connecting rods are upstanding and pivotally connected at one end thereof to the free ends of said arm portions, respectively.

3. A stabilizer as set forth in claim 2 wherein said support means comprises a pair of upstanding tubular guide members mounted on said vehicle body brackets, wherein said connecting rods are slidably mounted in said guide members, wherein said connecting rods have annular grooves and wherein said mechanical linkage comprises a pair of locking pins engageable in said grooves for preventing axial movement of said connecting rods relative to said guide members.

4. A stabilizer as set forth in claim 3 wherein said mechanical linkage further comprises biasing means for urging said locking pins away from said grooves and a pair of control levers for urging at the ends thereof said locking pins toward said annular grooves against the bias of said biasing means and wherein said selection means comprises a selection lever and a cable connecting said selection lever to said control levers in such a manner that turning of said selection lever causes said ends of said control levers to move toward and away from said locking pins.

5. A stabilizer as set forth in claim 4 wherein said selection means further comprises an extensible and contractible coupling disposed in said cable so that said coupling resiliently extends to allow full turning of said selection lever even when vertical positions of said annular grooves are different from those of said locking pins.

6. A stabilizer for a motor vehicle having a body and a pair of laterally opposed road wheels suspended from the vehicle body, said stabilizer comprising:
   a stabilizer bar extending transversely of the vehicle body;
   first and second connecting rods connected to the stabilizer bar;
   means for interconnecting the stabilizer bar and the first and second connecting rods between the vehicle body and the road wheels, the interconnecting means including means for supporting the connecting rods for axial movement of the connecting rods relative to the supporting means; and
   locking means operatively associated with at least the first connecting rod for selectively preventing relative axial movement between the first connecting rod and the supporting means, the locking means including a mechanical linkage movable between a first position wherein the linkage engages the connecting rod to prevent axial movement between the first connecting rod and the supporting means thereby effecting stabilizing action and a second position wherein the linkage is disengaged from the connecting rod to permit axial movement between the first connecting rod and the supporting means thereby reducing the effectiveness of the stabilizing bar and further including selection means coupled to the mechanical linkage for moving the mechanical linkage between the first and second positions.

7. A stabilizer as set forth in claim 1 wherein said support means comprises a pair of suspension members on which the road wheels are suspended, wherein said stabilizer bar is U-shaped and has a central portion at which it is pivotally mounted on the vehicle body and a pair of arm portions at the opposite ends of said central portion, and wherein said connecting rods are upstanding and mounted at one end thereof to the free ends of said arm portions, respectively.

8. A stabilizer as set forth in claim 7 wherein said support means comprises a pair of upstanding tubular members mounted on said suspension members, wherein said connecting rods are slidably mounted in said guide members, wherein said connecting rods have annular grooves, and wherein said mechanical linkage comprises a pair of locking pins engageable in said grooves for preventing axial movement of said connecting rods relative to said guide members.

9. A stabilizer as set forth in claim 8, in which said locking means further comprises biasing means for urging said locking pins away from said grooves, a pair of control levers for urging at one end thereof said locking pins toward annular grooves against the bias of said biasing means, and in which said selection means comprises a selection lever and a cable connecting said selection lever to said control levers in such a manner that turning of said selection lever causing said ends of said control levers to move toward and away from said locking pins.

* * * * *